(12) United States Patent  
Ulichney et al.

(10) Patent No.: US 8,456,699 B2
(45) Date of Patent: Jun. 4, 2013

(54) SYSTEM AND METHOD FOR CREATING A DATA-BEARING IMAGE

(75) Inventors: Robert Alan Ulichney, Stow, MA (US); Steven J. Simske, Fort Collins, CO (US); Matthew D. Gaubatz, Ithaca, NY (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 839 days.

(21) Appl. No.: 12/563,432

(22) Filed: Sep. 21, 2009

(65) Prior Publication Data

US 2011/0069328 A1     Mar. 24, 2011

(51) Int. Cl.
*G06K 15/00* (2006.01)
*H04N 1/40* (2006.01)

(52) U.S. Cl.
USPC ........... 358/1.9; 358/2.1; 358/3.01; 358/3.06; 358/3.09; 358/3.1; 358/3.11; 358/3.12; 358/3.3

(58) Field of Classification Search
None
See application file for complete search history.

(56) References Cited

U.S. PATENT DOCUMENTS

| | | | |
|---|---|---|---|
| 5,710,827 A | 1/1998 | Perumal, Jr. et al. | |
| 6,690,389 B2 | 2/2004 | Ulichney | |
| 7,034,955 B2 | 4/2006 | Bearss et al. | |
| 2003/0043412 A1* | 3/2003 | Roylance | 358/3.06 |
| 2006/0066908 A1* | 3/2006 | Kim | 358/3.2 |
| 2008/0144057 A1* | 6/2008 | McElvain | 358/1.9 |
| 2009/0103140 A1* | 4/2009 | Yamamoto | 358/3.09 |
| 2011/0051154 A1* | 3/2011 | Horn | 358/1.9 |

OTHER PUBLICATIONS

Pei, Novel Robust Watermarking Technique in Dithering Halftone Images, IEEE Signal Processing Letters, vol. 12, No. 4, pp. 333-336, Apr. 2005.
Chiang et al., Printer and Scanner Forensics, IEEE Signal Processing Magazine, pp. 72-83, Mar. 2009.

* cited by examiner

*Primary Examiner* — Benny Q Tieu
*Assistant Examiner* — Haris Sabah (57) ABSTRACT

A system for creating a data-bearing image can include a reference image generator configured to apply a clustered-dot halftone screen to a continuous-tone image. The resulting reference halftone image includes carrier cells in which a pixel cluster can be shifted to at least two shift positions in the carrier cell. The system also includes a payload encoder configured to segment the data payload and encode data segments into one of the carrier cells by shifting the cluster to one of the shift positions. The system also includes an output device configured to output the resulting data-bearing halftone image.

20 Claims, 8 Drawing Sheets

Dither Template

| 14 | 12 | 16 | 20 | 49 | 51 | 47 | 43 |
|----|----|----|----|----|----|----|----|
| 10 | 0  | 2  | 18 | 53 | 63 | 61 | 45 |
| 8  | 6  | 4  | 22 | 55 | 57 | 59 | 41 |
| 30 | 26 | 24 | 28 | 33 | 37 | 39 | 35 |
| 48 | 50 | 46 | 42 | 15 | 13 | 17 | 21 |
| 52 | 62 | 60 | 44 | 11 | 1  | 3  | 19 |
| 54 | 56 | 58 | 40 | 9  | 7  | 5  | 23 |
| 32 | 36 | 38 | 34 | 31 | 27 | 25 | 29 |

FIG. 1

Threshold Array

| 58  | 50  | 66  | 82  | 198 | 206 | 190 | 174 |
|-----|-----|-----|-----|-----|-----|-----|-----|
| 42  | 2   | 10  | 74  | 214 | 254 | 246 | 182 |
| 34  | 26  | 18  | 90  | 222 | 230 | 238 | 166 |
| 122 | 106 | 98  | 114 | 134 | 150 | 158 | 142 |
| 194 | 202 | 186 | 170 | 62  | 54  | 70  | 86  |
| 210 | 250 | 242 | 178 | 46  | 6   | 14  | 78  |
| 218 | 226 | 234 | 162 | 38  | 30  | 22  | 94  |
| 130 | 146 | 154 | 138 | 126 | 110 | 102 | 118 |

Highlight Cells

| Size | Bits |
|---|---|
| 1 | 3 |
| 2 | 3 |
| 3 | 3 |
| 4 | 3 |
| 5 | 2 |
| 6 | 2 |
| 7 | 1 |
| 8 | 1 |
| 9 | 1 |
| 10 | 0 |
| 11 | 0 |
| 12 | 0 |
| 13 | 0 |
| 14 | 0 |
| 15 | 0 |
| 16 | 0 |

Shadow Cells

| Size | Bits |
|---|---|
| 1 | 0 |
| 2 | 0 |
| 3 | 0 |
| 4 | 3 |
| 5 | 2 |
| 6 | 2 |
| 7 | 1 |
| 8 | 1 |
| 9 | 1 |
| 10 | 0 |
| 11 | 0 |
| 12 | 0 |
| 13 | 0 |
| 14 | 0 |
| 15 | 0 |
| 16 | 0 |

SYSTEM AND METHOD FOR CREATING A DATA-BEARING IMAGE

BACKGROUND

An ongoing challenge in computer imaging technology is that of acceptably rendering digitized images on display devices which were incapable of reproducing the full spectrum of intensities or colors present in the source image. Continuous-tone images are commonly halftoned, i.e. rendered to a bitonal image for output by such devices.

Hiding information in continuous-tone image data, often referred to as watermarking, is an established practice in the field of information technology. However the nature of such encoded images can change considerably when halftoned for printing. There is a need for processes of encoding data in images in ways that survive the halftoning process.

DETAILED DESCRIPTION

Reference will now be made to the exemplary embodiments illustrated, and specific language will be used herein to describe the same. Features and advantages of the invention will be apparent from the detailed description which follows, taken in conjunction with the accompanying drawings, which together illustrate, by way of example, features of the invention.

It is to be noted that, as used in this specification and the appended claims, the singular forms "a," "an," and "the" include plural referents unless the context clearly dictates otherwise.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, the term "substantially" refers to the complete or nearly complete extent or degree of an action, characteristic, property, state, structure, item, or result. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

The methods and systems described herein involve modifying the process of halftoning a continuous-tone carrier image so that a data payload can be incorporated into that image. In such a data-bearing image, sometimes referred to in the art as a steganographic image, the information hidden therein is substantially invisible to the human eye, so that the quality of the image is largely preserved.

Halftoning refers to any process that creates the illusion of continuous-tone images by judicious arrangement of binary picture elements, such as ink drops in the case of inkjet printers. Thus, halftoning is printing the simulation of a continuous-tone image, such as a shaded drawing or a photograph, with groups or cells of color or black dots. The dots are placed in such a way that they appear to the human eye to be a single color. Digital halftoning is sometimes called spatial dithering.

An ordered dither consists of turning on the output bit for a pixel if the intensity level is greater than the threshold of a particular matrix element just at that pixel position. Ordered dithering of images can employ clustered-dot and dispersed-dot methods. Clustered-dot halftoning is so named because it generates dots in "clustered" patterns. That is, as input intensity increases, new pixels intensified in each pattern are placed adjacent to already-intensified pixels. Clustered-dot halftoning is commonly used in both dry toner and liquid toner electrophotographic processes because it produces dots that are quite stable when rendered by these devices. This stability can be important to the aims of embedding data in halftones, in that it can be less susceptible to errors and data loss than dispersed-dot techniques. The use of any of the clustered-dot algorithms known in the art are contemplated for use with the present embodiments.

Before describing the embodiments of the invention, a brief discussion of dithering with clustered-dots is deemed useful. The nature of any ordered dither is dictated by a deterministic, periodic array of threshold values. Ordered dithering employs a dither matrix, which is an array of integer threshold values, to produce the shaded output image. The dither matrix is commonly smaller than the input image, and therefore is repeatedly tiled over the input image. Each color value of the input image is compared against a dither matrix threshold value. When the input value is greater than the threshold value, the output pixel is turned "on". Conversely, if the input value of the pixel is less than or equal to the threshold value, the output pixel is turned "off". It should be noted that the output described by the relative terms "on" and "off" will depend on the output device. For example, turning "on" a pixel of a halftone display can refer to the pixel going from black to white. However, printing the image with a printer could involve a reversal in which black pixels represent actual output (i.e. the printing of a dot of black ink). Because the dither matrix thresholds essentially determine which pixels of the input image are displayed on the output device, the ordering of the threshold values in the dither matrix is important to the quality of the output image.

Figure 1:
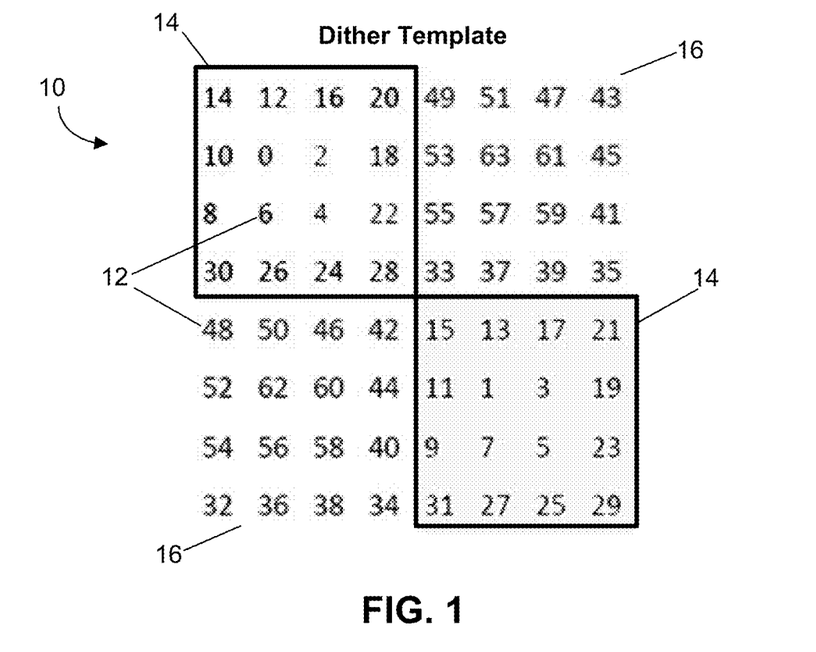
FIG. 1 is a dither template for use in clustered-dot halftoning in accordance with an embodiment of the present disclosure.

In the case of clustered-dot halftoning, the thresholds are arranged so that output pixels will form ever-increasing white cluster sizes as input values increase from full black, and then ever-decreasing black cluster sizes as input values further increase to full white. This rule or order of thresholds is specified by the dither matrix or dither template. An exemplary dither template 10 is shown in FIG. 1. This template comprises an 8×8 matrix of pixel positions 12 with values from 0 to 63 that define the order that pixels will be turned "on" or "white". This arrangement forms a 45-degree screen. The 4×4 submatrices defined by boxes represent shadow cells 14, and the unboxed 4×4 submatrices represent highlight cells 16. The two types of cell are also distinguishable by the spatial arrangement of pixel activation order. Shadow cells produce patterns that manifest as white clusters surrounded by black (i.e. pixels are activated centrally first then progressively to the edges). Highlight cells manifest as black clusters surrounded by white (i.e. pixels are activated first on the edge and then progressively centerward.)

The actual threshold values that are to be used to compare against 8-bit input pixel values can be normalized. One purpose of such a step can be to align the mean input intensity with the range of thresholds or to scale the input range to the threshold range. In this way, the most possible threshold values can be utilized in the dither template. Numerous approaches to normalization are known to those skilled in the art and can be used in accordance with the present embodiment. One mean-preserving relationship that can be used to scale the template values T[x,y] to threshold array values A[x,y] is:

$$A[x,y]=255-int\{(255/64)(T[x,y]+\tfrac{1}{2})\}$$ [Equation 1]

Figure 2:
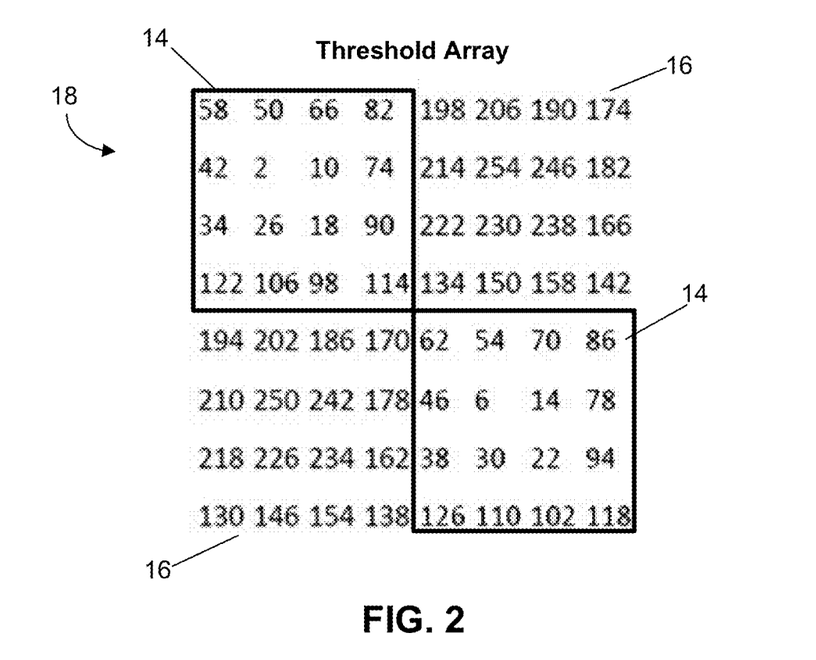
FIG. 2 is a threshold array based on the dither template of FIG. 1 in accordance with an embodiment of the present disclosure.

The resulting normalized threshold array 18 is shown in FIG. 2. A halftoning algorithm uses this array to compare with an input pixel $I_i$ to binarize the output pixel $I_o$ as follows:

$$\text{if } I_i \geq A[x,y] I_o=1; \text{ else } I_o=0$$ [Equation 2]

Figure 3:
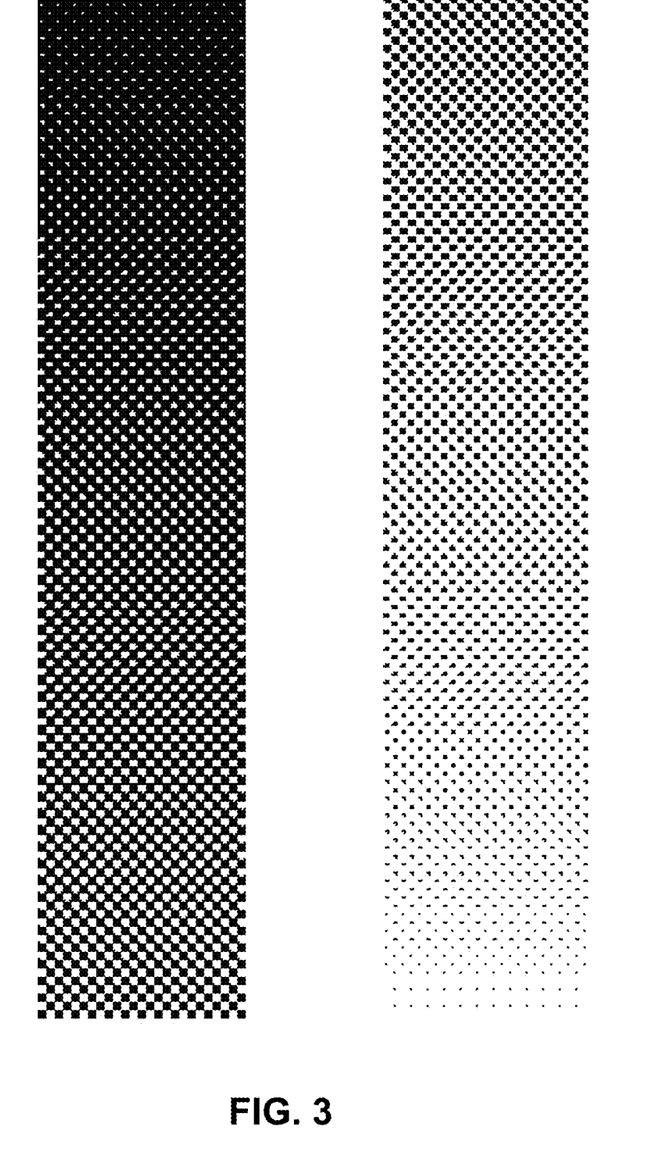
FIG. 3 is a halftone image rendered from a folded grayscale ramp in accordance with an embodiment of the present disclosure.

Using this array to halftone an input image that consists of a folded grayscale ramp produces the image shown in FIG. 3. It illustrates the shadow cells with white "holes" and highlight cells with black clusters. For constant areas of the input image, the 4×4 highlight cells take on the shapes shown in FIG. 4. With increasing input intensity, additional pixels are printed (or omitted), causing the cluster to grow. Next to each cell the number of white pixels that comprise the center cluster is indicated. Likewise FIG. 5 lists all sixteen shadow cells with the number of black cluster pixels indicated. It should be noted that the cell shapes shown are dictated by the specification of the dither template 10 in FIG. 1. Use of a differently patterned template would result in a different pattern of cluster growth. Any dither template arrangement suited for producing clustered-dot patterns are contemplated for use in the embodiments described herein.

It should be noted that the progression of cluster shapes arising from a dither template such as described above are used to render constant areas of the input image. High-frequency detail (e.g. edges) can pass through a dither cell intact. That is, the shape of the cell will reflect the detail shape, rather than an intensity-dependent cluster. The deviations of these cell shapes in response to such detail is referred to as "partial dots". As a result, the halftoned image more accurately preserves edges and details so as to provide a more accurate rendition of the continuous-tone image.

Figure 4A:
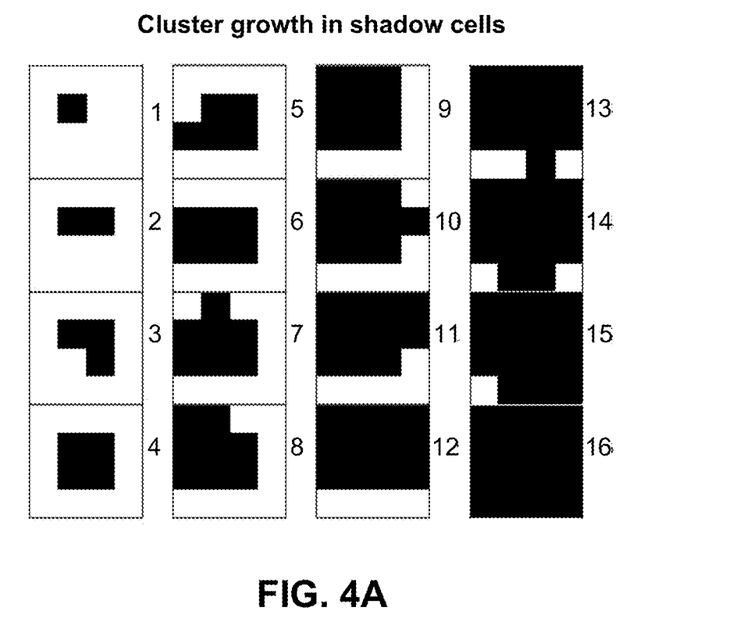
FIG. 4A shows the change in cluster shape with increasing cluster size in shadow cells rendered using the dither template of FIG. 1 in accordance with an embodiment of the present disclosure.
Figure 4B:
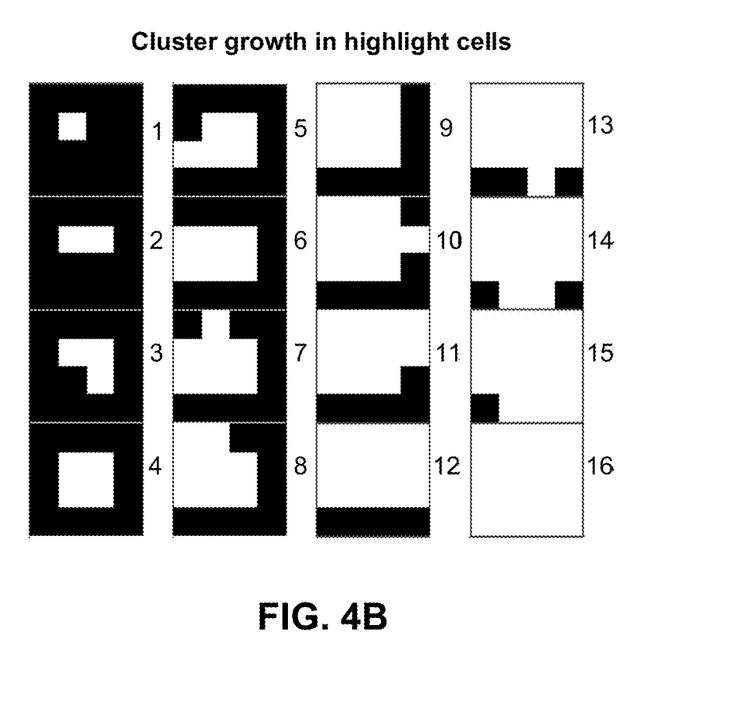
FIG. 4B shows the change in cluster shape with increasing cluster size in highlight cells rendered using the dither template of FIG. 1 in accordance with an embodiment of the present disclosure.
Figure 5:
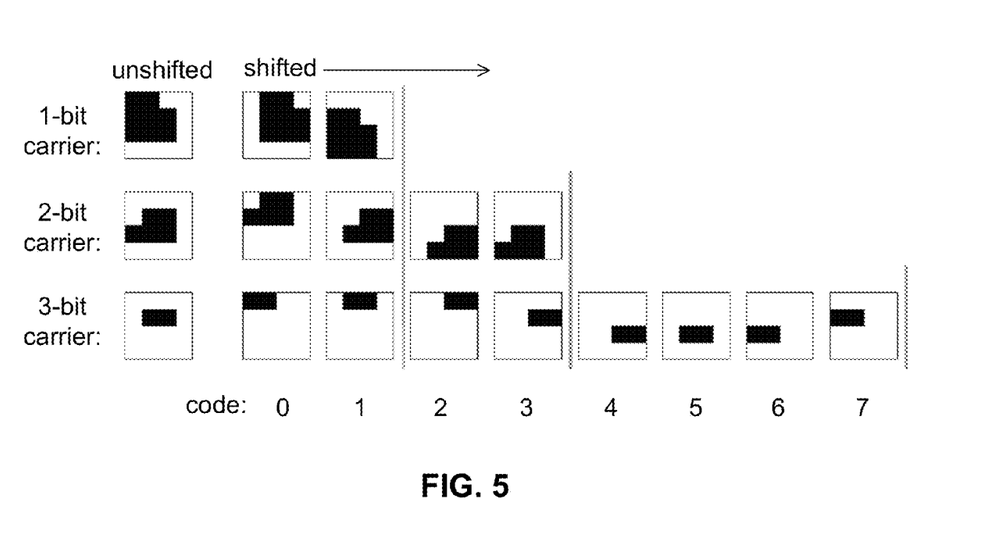
FIG. 5 shows available shift positions and corresponding codes for exemplary shadow cells of three different bit sizes in accordance with an embodiment of the present disclosure.

According to the methods of the present embodiment, information can be embedded into a subset of the rendered cells by encoding the information as single pixel shifts of the clusters within each cell. It should be noted that not all cell shapes will afford their clusters the same degree of freedom to move. Cells that have room for a cluster to move to at least 2 single pixel shift positions can encode at least one bit of data, and therefore can be defined as "carrier cells". For example, cells 1 through 9 in both FIGS. 4A and 4B are potential carrier cells.

More available shift positions in a shape means more bits can be encoded in the cell. Cells 1 through 4 can move to all eight surrounding positions and can thus carry three bits. Cells 5 and 6 can move to five positions, four of which can be used to encode 2 bits. Cells 7, 8 and 9 can move to three positions and thus can only carry 1 bit. This principle is illustrated further in FIG. 5 for an exemplary highlight cell.

Figure 6:
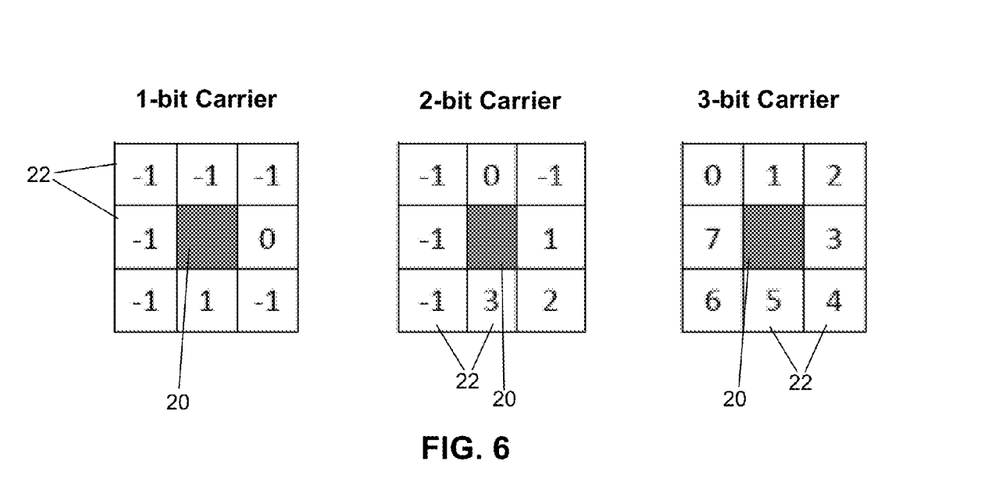
FIG. 6 shows exemplary shift rule specifications for carrier cells of three different bit sizes in accordance with an embodiment of the present disclosure.

The mapping of 1-bit, 2-bit, and 3-bit codes to shift positions can be defined by a shift rule. One exemplary shift rule 19 is illustrated in FIG. 6, in which an unshifted position 20 is shown in the center of each 3×3 array, with the remainder of the array comprising putative shift positions 22. An entry of −1 is used to indicate shift positions that are not used, and entries of 0, 1, 2, etc. indicate the shift position of a code of that particular value. For example, for the 1-bit carrier shift rule embedding a code of "0" will cause a shift right by 1 pixel while embedding a code of "1" will cause a shift down by 1 pixel. Other shift rules can be contemplated by those skilled in the art, and any such rule can be used in accordance with the present embodiment. It should be noted that, as with a number of aspects of the encoding process, recovery can be facilitated by making the same shift rule used to encode data available to the decoding process.

In a particular embodiment, unshifted carrier cells can be used as "marker cells" and used to communicate special signals to a data recovery system. For example, a particular number of consecutive marker cells can be used to indicate the separation between repeating streams of payload bits.

An important consideration regarding carrier cells is that some potential carrier cells may not be practical for use as data carriers. For example, due to cluster size, cluster shape, output device limitations, media limitations, recovery device input limitations, or any combination thereof, some cells may not be reliably detected on recovery. Employing these cells for encoding can increase the decoding error, resulting in data corruption or loss. Therefore it may be prudent to evaluate the viability of a particular carrier cell size to be detected at each of its candidate shift positions in view of the targeted printer or other output device. Knowledge of the recovery rates for each highlight and shadow cell can then be incorporated in the encoding process.

Figure 7:
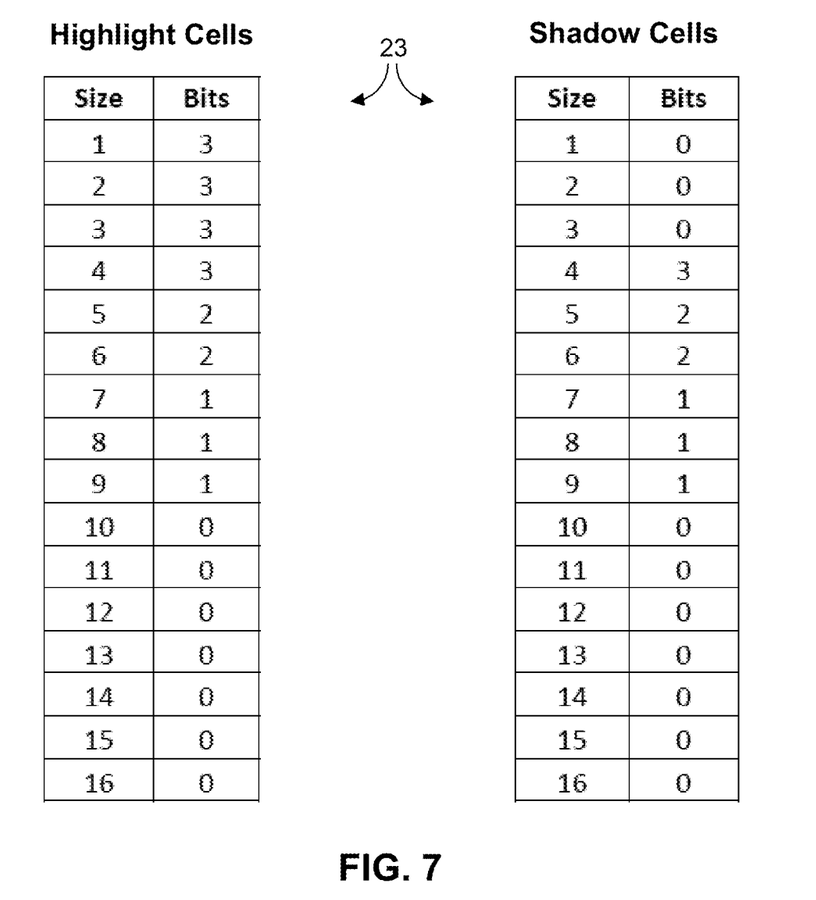
FIG. 7 shows a table specifying an exemplary carrier cell selection rule in accordance with an embodiment of the present disclosure.

In a particular embodiment, a rule can be employed to specify which carrier cells and shift positions will be used for data encoding. This carrier selection rule 23 can be largely specific to a particular type of target device, to a particular category within that type, or even to a specific device. FIG. 7 shows an example of a selection rule specification, in which each cluster size is either accorded a bit value or designated as a non-carrier. In these tables a value of zero bits indicates that that cell type is a non-carrier. In the example shown, the selection rule specifies that all potential highlight cells are useable with their maximum bit capacity, while the smallest shadow cells (1, 2, and 3) are deemed non-carriers. Such a determination may be made based on the limitations of a target device. For example, such small white dots may not be produced reliably enough by certain printers due to dot gain in surrounding pixels. Accordingly, in one aspect of the embodiment, an encoding system is designed with particular known output and recovery devices in mind. A selection rule is used that provides for carrier cells that are rendered robustly in the data-bearing output and/or are reliably detected by the recovery device. In a more particular aspect, a system can be designed around a specific device pair (e.g. a specific printer and a specific scanner).

After carrier selection, a number of non-carrier cells may remain. As discussed above, these can include cells having partial dots due to edges or other details in the image, as well as potential carrier cells that are excluded by the selection rule. As will be discussed further below, these non-carrier cells can serve useful purposes in the recovery process, such as to delineate data areas or provide points of reference for properly aligning images.

In view of the above, the present embodiments directed to generating a halftone image with a data payload encoded therein can be further described. Halftoning is generally directed at approximating continuous tone output on devices that are limited in their capability to render continuous tones, either by their architecture and/or by bandwidth and other computational constraints. In particular this approach is commonly used in printing, as the digital marking engine of printers cannot render an infinite number of brightness levels. As such, the data-bearing halftone of the present embodiment can be a print image generated by a printer. However, it should be noted that other output formats in which a halftone can be provided are also contemplated as suited for the present embodiments.

In an embodiment, a continuous-tone image is selected to serve as the carrier image for the data payload. Any such image can be used, though in a given case particular considerations may make certain images preferable to others. For example, it may be advantageous for the image to include regions that will produce a useful number of carrier cells in view of the payload to be encoded. Similarly, it may also be advantageous for the image to include a certain number of non-carriers as reference points. The continuous-tone image may be in grayscale or color. In a particular embodiment, the image is a grayscale image.

A general embodiment provides a process and system for inserting a data payload into a carrier image to produce a data-bearing halftone image. The image is analyzed according to the threshold template and selection rule to determine the location, size, and number of carrier cells the image contains. This information is used to prepare the intended data payload to be embedded in the image. More particularly, the payload is divided into data segments, the number and sizes of which correspond to that of the available carrier cells. The image is dithered to create a halftone image composed of carrier cells and non-carrier cells. Then the payload segments are encoded in the image, a process in which carrier cells undergo cluster shifting according to the shift rule. The image can then be rendered by an output device into a form that is available for input to a recovery device (e.g. printed as a hardcopy by a printer).

Figure 8:
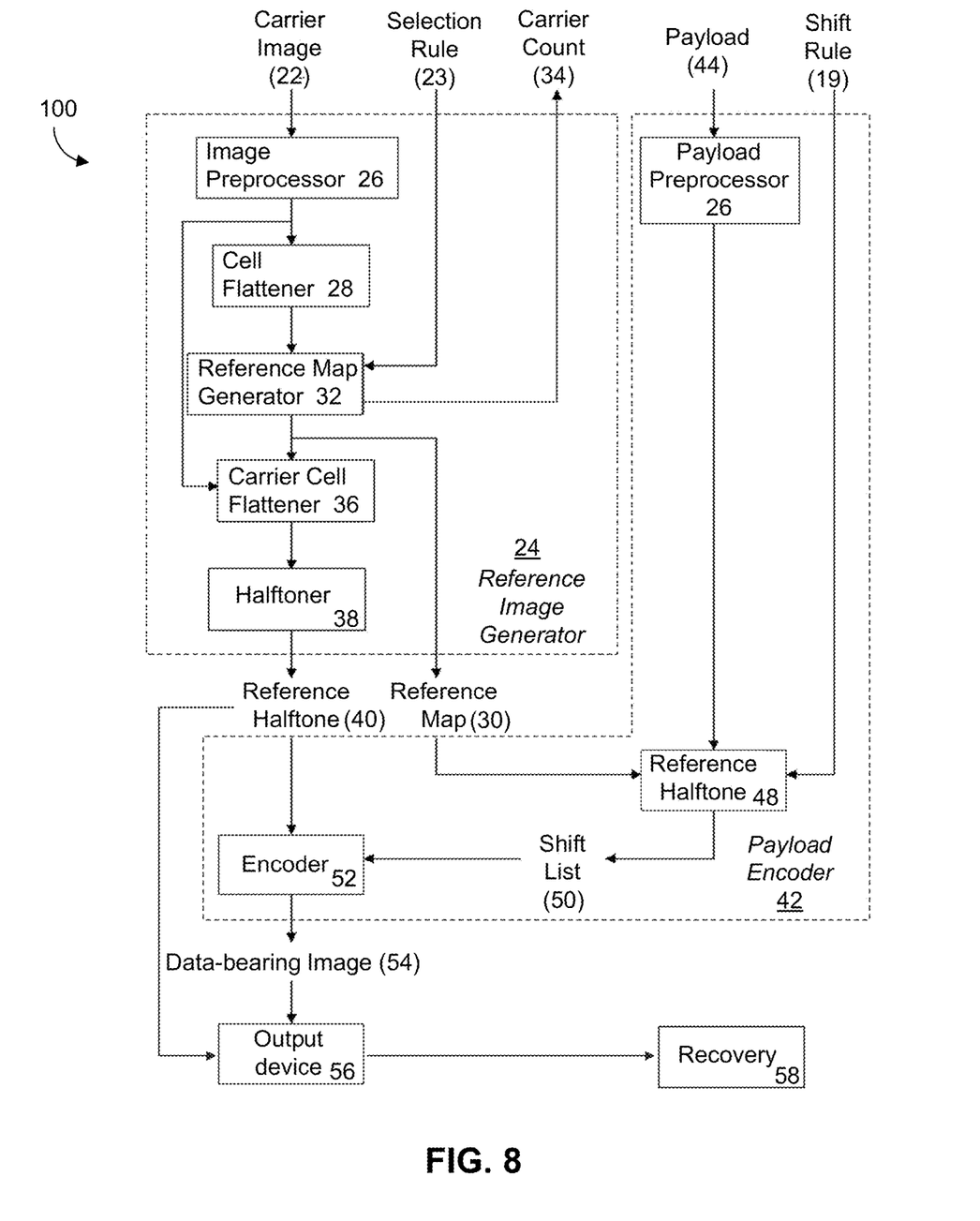
FIG. 8 is a diagram of a system in accordance with an embodiment of the present disclosure.

According to a more detailed embodiment, the system can comprise a number of subsystems, devices, and processes. An exemplary arrangement for such a system 100 is illustrated in FIG. 8. The processes can include computer code embodied in a device or in computer-readable form. Furthermore, the various subsystems, devices, and processes may be components present in a single machine, such as a scanner/printer or scanner/copier/printer. Alternatively, they may be distributed among different related machines that are used in accordance with the process described herein.

The processes of the present embodiment involve receiving inputs (e.g. images, data, specifications, and instructions) as well as producing both intermediate and final outputs (e.g. digital or hardcopy images, image data, and data maps). Accordingly the system and subsystems can include input and output devices conventionally used in the graphics arts for handling items of a given modality. These include, without limitation, input devices such as cameras, scanners, keyboards, compact disk drives, card readers, and the like, as well as output devices such as printers, video displays, video projectors, and the like. A principal input to the system is the carrier image 22. This can be a continuous-tone image present as a photograph, and may be a standalone representation or may be present in a document. Therefore, an embodiment includes inputting the image by way of a scanner or similar device configured for digitizing images. In one aspect, certain processes and subsystems of the present embodiment can be integrated into code and/or circuitry such as are found in conventional scanners. In another embodiment, the carrier image can be a digital image file embodied on computer-readable media.

The system can further include a reference image generator subsystem 24, which is directed to executing the halftoning process in a way that produces the various outputs needed for the process. In particular, these include a halftone rendering of the carrier image as well as a specification of the image's data carrying characteristics. As such, the reference image generator can include a collection of interconnected devices or subsystems.

In one aspect of the embodiment, the process described herein includes, modifies, and/or replaces the steps carried out by conventional printer processors in printing a halftone rendering of an image. As such, in a particular aspect, the reference image generator can be a printer controller or a component thereof.

In a particular embodiment, the reference image generator can include an image preprocessor 26. To produce the eventual data-bearing image, the present method can involve modifying or replacing the rendering system normally built into the target printer or other output device. Accordingly, the processes typically associated with preparing an image for printing can be performed by the image preprocessor. In one embodiment, these processes can include decompression of the image, adjusting the image histogram to accommodate non-linearities in the input-to-hardcopy print process, and scaling the image to the device resolution of the printer. These processes are exemplary of typical preprocessing for rendering, but are not intended to be limiting. Other processes that are associated with rendering images in a given target device are known in the art and can be included in the image preprocessor.

The next process in the reference image generator can comprise flattening of the cells in the image to facilitate the detection and selection of potential carrier cells. Accordingly, an embodiment of the system can include a cell flattener 28. Under this process, the input image is segmented into blocks that correspond to halftone cluster locations. The cell flattener sets all of the pixels in each block to a single representative value, such as the average of the input therein. In the examples illustrated herein, in which halftone cells are comprised of 4 by 4 pixels, the cells have all 16 pixels temporarily set to a value equal to their average by the cell flattener. As a result, this flattened image is one-fourth the size of the original carrier image in each dimension.

In order to properly assess the data capacity of a carrier image, as well as to prepare the payload to fit in that capacity, the present embodiment includes a reference map 30 of the carrier image. Such a map is the product of an analysis of the image, said analysis including an inventory of available carrier cells. In this process the flattened image (now segmented into cells and flattened so that each cell holds a single average value) is assessed using the carrier selection rule. More particularly, each cell is assessed based on its value to determine whether the resulting halftone cluster will exhibit a shape that is useful for encoding data when rendered by the target output device.

Accordingly, the system can comprise a reference map generator 32, input to which can include the flattened carrier image and the carrier selection rule 23. By referring to the dither threshold array 18 (FIG. 2) the reference map generator first applies a halftone screen to the image, segmenting the image into highlight cell and shadow cell regions.

The reference map 30 can then be populated according to carrier selection rules. Each highlight cell and shadow cell can be halftoned according to the applicable equation (e.g. Equation 2), and the cluster size can be determined by counting the number of pixels having a value of 1. A table can be generated in which each possible input value (e.g. 0 to 255 for the 8-bit example) is mapped to a cell size. The number of bits corresponding to each cell size is provided by the corresponding carrier selection rule 23 (i.e for highlight cells or for shadow cells).

The result is a reference map 30 that specifies all of the locations in which payload data can be encoded and the amount of data each location can hold. The reference map can present this information alphanumerically, e.g. as a table. Alternatively, the reference map can provide a graphic representation. In one embodiment, the reference map can be a depiction of the segmented image in which all of the cells are shown with a code signifying their status (carrier or non-carrier) and data capacity. In an example of this embodiment, the cells can be color-coded, using colors that are recognizable and distinguishable at the recovery step.

Using the information used to generate the reference map 30, another output of the reference map generator can also provide a carrier count 34, i.e. the total bit capacity of all carrier cells in the carrier image. As will be discussed below with reference to the payload, this information can be used to evaluate the image's suitability for a particular payload of known size, and to process a payload in preparation for embedding the payload in the image.

According to the present embodiment, the reference map can also be used to further process the image. In particular a carrier cell flattener 36 can use the reference map and the data-carrier image to identify the cells tagged as carriers in the original image. The carrier cell flattener then flattens only those cells, leaving the non-carrier cells intact. The non-carrier cells will retain the untouched high-frequency detail that will be manifested as partial dots in the output halftone.

Figure 9:
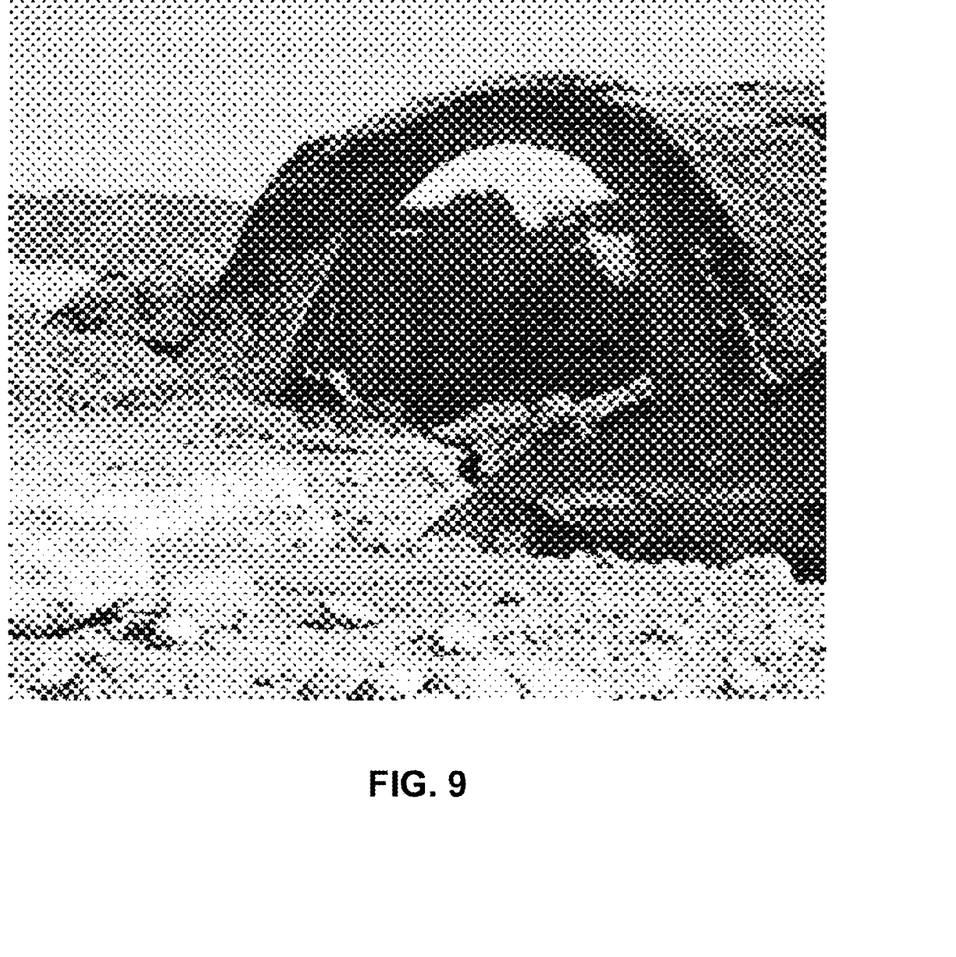
FIG. 9 is an exemplary reference halftone image in accordance with an embodiment of the present disclosure.

The final step in the reference image generator subsystem can comprise a halftoner subsystem 38. Here the carrier image with the selective cell regions flattened is halftoned using the threshold array 18 to produce a reference halftone 40. An exemplary clustered-dot reference halftone in accordance with the present embodiments is shown in FIG. 9. At least two purposes can be served by the reference halftone. One purpose is to receive and carry the data payload encoded in the carrier cells present in the image. However, as discussed below, an unaltered (i.e. non-data-bearing) reference halftone image can also be used as a reference for recovery of data from a data-bearing version of that image. Accordingly, more than one copy of the reference halftone can be produced by the halftoner at this point in the process. In a particular embodiment, a portable copy of the image (e.g. a hardcopy or a digital file on removable media) can be output by the system at this point.

The system can further comprise a payload encoder subsystem 42 for preparing a data payload 44 to be embedded into the reference halftone. In one embodiment, the payload encoder can operate in sequence with the reference image generator. In an alternate embodiment, the payload encoder can carry out a subset of its operations in parallel with the reference image generator 24. As shown in FIG. 8, a principal input to the payload processor is the data payload 44, which can comprise any type of data amenable to encoding.

The payload 44 can optionally be subjected to one or more preprocessing steps before being encoded. The types of preprocessing that may be suitable or desired will depend on the type of data in the payload as well as the intended use or destination of the data. Accordingly, the system can include a preprocessor subsystem 46 comprising various processes needed to yield the desired data format. For example, prevailing security protocols may call for the data to be encrypted, thereby imparting an extra level of security to the payload contents. Encryption algorithms and techniques are common in the art, and any such approach to encrypting data that provides an output amenable to encoding may be included in the present embodiment. According to another embodiment, the size of the payload and/or the carrying capacity of the carrier image may make it useful to include data compression.

In a particular embodiment, the preprocessor 46 can include error-correction encoding. Error-correction codes are well known in the art. Particularly useful approaches to error-correction include forward error correction techniques, in which redundant bits are added to encoded data to protect against loss due to sporadic errors in transmission or decoding. One advantage of forward error correction is that errors can be detected without the need for a back-channel. In the context of the present embodiment, this could prove to be a considerable advantage. For example, in certain circumstances one-pass acquisition may be the only practical option in recovering the payload 44 from a data-bearing hardcopy.

Accordingly, in a particular embodiment, the payload 44 can be expanded to include redundancy. Recovering errors from encoded digital data in halftone clusters is similar to the error recovery process of encoding data as pits in a compact disk; the compact disk encoding standard calls for approximately triple redundancy in its error-correction encoding to achieve the desired reliability level, to compensate for not only the uncertainties of reading the pits but also to handle anticipated scratches and other degradations. Similarly, data-bearing prints of the present embodiments may have uncertainties in the reading of cluster shifts and can suffer degradations by way of smudges and other deformations. The desired robustness of recovery will dictate the degree of redundancy used.

As discussed above, the output of the reference map generator for a given carrier image can include a carrier count 34.

Together with the carrier selection rule 23, this can be an important piece of information in determining the size payload that the image can accommodate. As such, the reference image generator 24 as a whole can be used to create and assemble a database of reference maps 30 and carrier counts for a plurality of images. A method of selecting an appropriate carrier image 22 for a given payload 44 can include determining the size of the payload after any preprocessing steps, and then consulting the database for images having suitable data capacity.

An exact match between payload size and carrier capacity is not necessary, i.e. the capacity may be greater than the payload. However, it may be beneficial to utilize the full capacity of the carrier image to the extent possible. In one solution for payloads having bit counts that are shorter than the carrier count, the payload can simply be repeated over and over until all carrier cells are used. This approach can actually serve as an extra level of security, in that it can reduce the risk that damage to a portion of the image will result in loss of data. Accordingly, a particular embodiment can comprise embedding some number of copies of a payload in an image, where the image has a capacity that is at least that number multiple of the payload size. Conversely, in another embodiment, a data payload may be distributed among a number of carrier images, either because the data payload is too large to be accommodated by one image, or for added security.

The encoding and embedding method of the present embodiment further comprises encoding the payload data into a pattern of cluster shifts and executing those shifts on the reference halftone image. The particular cluster shifts constituting the code are specified by the shift rule 19. Accordingly, the encoder subsystem 42 can comprise a shift list generator 48 that is configured to receive the reference map 30, shift rule 19, and payload 44 as inputs and break up the payload into data segments whose number and sizes correspond to the those of the selected carrier cells designated in the reference map.

In a more particular aspect, the shift list generator 48 uses the reference map to determine the order of carrier cells in the map as well as the bit capacity of each cell. The shift generator then breaks the payload into segments of n bits according to the current carrier cell, where n is the bit capacity of that cell. The shift generator uses the shift rule to assign a particular cluster shift to each data segment. The shifts to be executed to encode a given payload are listed in a shift list 50. The shift list is a principal output of the shift generator. The shift list can also include designations of unshifted cells to serve as markers in the bit stream, e.g. to separate two iterations of the payload data, or to signify the end of the data to be encoded.

Figure 10:
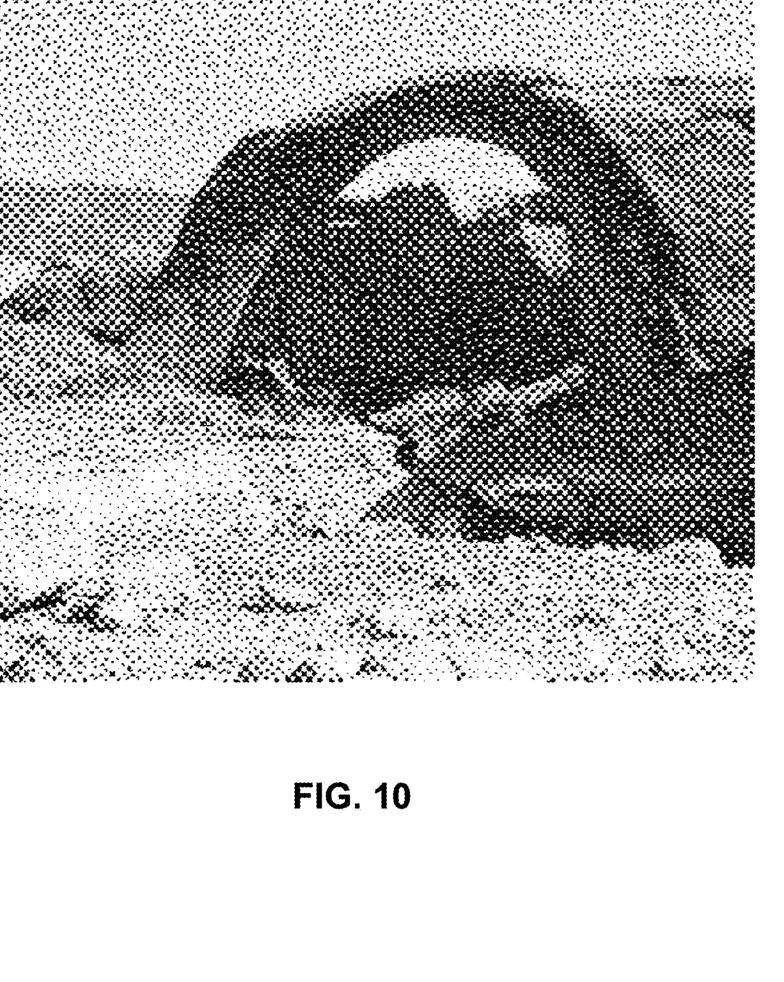
FIG. 10 is an exemplary data-bearing halftone image generated from the reference halftone image of FIG. 9 in accordance with an embodiment of the present disclosure.

The shift-based encoding is then executed on the reference halftone. In a particular embodiment, an encoder 52 receives the shift list 50 and reference halftone 40 as input and executes the shifts designated in the shift list to generate the data-bearing halftone. More specifically, the shift list provides the encoder with instructions as to which carrier cell clusters to shift and in which direction to shift those clusters. Cluster shifting can be executed until the complete payload is embedded at least once or until the available carrier cells are exhausted. As discussed above, special markers in the data-bearing halftone can be indicated by unshifted carrier cells to assist recovery. An exemplary data-bearing halftone image based on the reference halftone image in FIG. 9 is shown in FIG. 10.

Once the data payload 44 is embedded in the image, the data-bearing halftone image 54 can be output in some form. In one aspect it can be useful to utilize a form that serves the purpose of getting the data to its intended recipient. In a particular embodiment, the data-bearing halftone image is provided as a hardcopy. The hardcopy image may be a standalone product or incorporated into a product that includes one or more images, such as a document or a label. The cluster shifting process can constitute one of the final steps in an overall process of rendering of the image by the output device, e.g. by the printer controller of a printer.

The present embodiment also can include processes for recovering the data payload from the carrier image. The method of recovery will depend to a degree on the format in which the data-bearing image 54 is provided. The discussion of recovery will be directed mostly to approaches typically used on print images. However, those skilled in the art will recognize that the principles discussed herein can be adapted to deal with other formats, such as digital files.

The steps involved in recovering and decoding data will be determined to an extent by the manipulations made in creating the halftone image and in encoding the data. Therefore, to facilitate recovery certain information, processes, and outputs can be made available to the recovery process. This symmetrical aspect can be enhanced by incorporating certain components in both systems. One approach can involve including image generation, data encoding, and recovery in a single device that can be used by both sender and recipient of the data. In another approach, both sender and receiver can have access to certain information (e.g. reference map 30, shift rule 19, reference halftone image 54) in a form that can be uploaded to an existing device.

According to a general embodiment, the data-bearing halftone image 54 can be input into a recovery system 58, the carrier cells can be identified by referring to the reference map, and the payload encoded therein can be extracted. In one embodiment, the reference map can be imported into the system at the time of recovery. Alternatively, the reference map can be made available in a database comprising reference maps for a number of carrier images. These carrier images can have been mutually designated for use by both the sending party and the recipient.

In a more specific aspect of the embodiments, the recovery system can refer to the reference map to ascertain the location of the carrier cells. Then the system can assess the cluster position in each carrier cell in the data-bearing image as compared to the corresponding cell in the reference image. Where a difference of cluster position is detected, the value of the shift direction can be ascertained by reference to the shift rule. In this way, the data segments of the payload can be decoded and reassembled to recover the payload.

Recovery of embedded code in a data-bearing image can be complicated by the approach used to scan the image and the limitations of the particular device. For example, scanning a printed image can raise a host of issues, arising both from the printer (e.g. dot gain, black-white non-linearities) and the scanning device (e.g. positioning, alignment, scaling, zooming). In addition, In accordance with the present embodiment, the presence of non-carrier (reference) cells can be used by the recovery system to calibrate the acquired data-bearing image against the reference map and the reference halftone image.

While the exemplary embodiments described above and illustrated in the accompanying figures are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A system for creating a data-bearing image, comprising:
A reference image generator configured to apply a clustered-dot halftone screen to a continuous-tone image and thereby produce a reference halftone image, where the reference halftone image comprises carrier cells, each of at least some of the carrier cells comprising a respective pixel cluster of dots and at least two shift positions in different directions to which the respective pixel cluster, is shiftable,
a payload encoder configured to segment a data payload into a plurality of data segments, and encode the data segments into respective ones of the carrier cells by shifting the respective pixel clusters to one of the shift positions to produce a data-bearing halftone image, and
an output device configured to output the data-bearing halftone image.

2. The system of claim 1, wherein the reference image generator further comprises a reference map generator configured to output a count of carrier cells, a data capacity for the plurality of carrier cells in the reference halftone image, and a location for the plurality of carrier cells in the reference halftone image, wherein the data capacity is a function of a number of shift positions in the carrier cell.

3. The system of claim 1, wherein the continuous-tone image comprises a grayscale image.

4. The system of claim 1, wherein the reference halftone image further comprises a plurality of reference cells, where the plurality of reference cells include pixel clusters and fewer than two shift positions.

5. The system of claim 1, wherein the data segments are encoded into more than one carrier cell.

6. The system of claim 1, wherein the carrier cells include shadow carrier cells having pixel clusters comprising white pixels, and highlight carrier cells having pixel clusters comprising black pixels.

7. The system of claim 1, wherein the output device is configured to output the data-bearing halftone image as a printed image.

8. The system of claim 1, wherein the output device is further configured to output the reference halftone image.

9. The system of claim 1, further comprising a recovery unit configured to recognize the plurality of carrier cells in the data-bearing halftone image, determine whether the pixel cluster in the carrier cell is shifted, and decode the shift to recover the data segment encoded in the carrier cell.

10. The system of claim 9, wherein the reference image generator, payload encoder, recovery unit, and output device are all present in a single apparatus.

11. A method for creating a data-bearing image, comprising:
applying a clustered-dot halftone screen to a continuous-tone image and thereby produce a reference halftone image, where the reference halftone image comprises carrier cells, of at least some of the carrier cells comprising a respective pixel cluster of dots and at least two shift positions in different directions to which the respective pixel cluster, is shiftable,
segmenting a data payload into a plurality of data segments,
encoding the data segments into respective ones of the carrier cells by shifting the respective pixel clusters to one of the shift positions to produce a data-bearing halftone image, and
rendering the data-bearing halftone image with an output device.

12. The method of claim 11, further comprising generating a count of carrier cells, a data capacity for the plurality of carrier cells in the reference halftone image, and a location for the plurality of carrier cells in the reference halftone image, wherein the data capacity is a function of a number of shift positions in the carrier cell.

13. The method of claim 12, wherein the segmenting includes referring to the count of carrier cells and the data capacity.

14. The method of claim 11, wherein the continuous-tone image comprises a grayscale image.

15. The method of claim 11, wherein the reference halftone image further comprises a plurality of reference cells, where the reference cells include a pixel cluster and fewer than two shift positions.

16. The method of claim 15, wherein a subset of the carrier cells are also designated as reference cells according to a selection rule adapted for the output device.

17. The method of claim 11, wherein the data segments are encoded into more than one carrier cell.

18. The method of claim 11, wherein the reference halftone image is also output by the output device.

19. The method of claim 11, wherein the carrier cells include shadow carrier cells having pixel clusters comprising white pixels, and highlight carrier cells having pixel clusters comprising black pixels.

20. A method of recovering a data payload from a data-bearing halftone image generated by the method of claim 11, comprising
recognizing carrier cells in the data-bearing halftone image;
determining whether the pixel cluster in the carrier cell is shifted to a shift position; and
decoding the shift position to recover the data segment encoded in the carrier cell.

* * * * *

UNITED STATES PATENT AND TRADEMARK OFFICE
CERTIFICATE OF CORRECTION

PATENT NO. : 8,456,699 B2
APPLICATION NO. : 12/563432
DATED : June 4, 2013
INVENTOR(S) : Robert Alan Ulichney et al.

Page 1 of 1

It is certified that error appears in the above-identified patent and that said Letters Patent is hereby corrected as shown below:

In the Claims

Column 11, line 7, in Claim 1, delete "A" and insert -- a --, therefor.

Column 12, line 5, in Claim 11, delete "cells," and insert -- cells, each --, therefor.

Signed and Sealed this
Twentieth Day of August, 2013

Teresa Stanek Rea
*Acting Director of the United States Patent and Trademark Office*